United States Patent [19]
Hochgraf

[11] Patent Number: 5,905,367
[45] Date of Patent: May 18, 1999

[54] POWER INVERTER APPARATUS USING A TRANSFORMER WITH ITS PRIMARY WINDING CONNECTED THE SOURCE END AND A SECONDARY WINDING CONNECTED TO THE LOAD END OF AN AC POWER LINE TO INSERT SERIES COMPENSATION

[75] Inventor: Clark Glenn Hochgraf, Monroeville, Pa.

[73] Assignee: Siemens Westinghouse Power Corporation, Orlando, Fla.

[21] Appl. No.: 09/082,661

[22] Filed: May 21, 1998

[51] Int. Cl.$^6$ .................................................. G05F 1/70
[52] U.S. Cl. ......................................... 323/210; 323/356
[58] Field of Search .................................... 323/205, 207, 323/208, 209, 210, 211, 355, 356; 307/102, 105

[56] References Cited

U.S. PATENT DOCUMENTS

| | | | |
|---|---|---|---|
| 4,674,024 | 6/1987 | Paice et al. | 363/71 |
| 4,755,738 | 7/1988 | Shimamura et al. | 323/210 |
| 5,329,222 | 7/1994 | Gyugyi et al. | 323/207 |
| 5,347,166 | 9/1994 | Schauder | 307/113 |
| 5,610,501 | 3/1997 | Nelson | 323/207 |
| 5,642,007 | 6/1997 | Gyugyi et al. | 307/102 |
| 5,751,138 | 5/1998 | Venkata et al. | 323/207 |
| 5,754,035 | 5/1998 | Sen | 323/207 |

*Primary Examiner*—Adolf Deneke Berhane

[57] ABSTRACT

Series voltage compensation is provided in an ac power line by connecting the inverter unit of a dynamic voltage restorer (DVR) in series with the primary winding of a load transformer, which may already be present, thereby eliminating the need for injection transformers. For three-phase ac power lines the three primary phase windings can be either wye or delta connected. If they are wye connected, a three-phase inverter with a common dc source is preferred. For delta connected primary phase windings, separate single-phase inverters each with its own floating dc source can be directly connected in series with each primary phase winding. Preferably however, the poles of a two-phase inverter are direct connected in series between two of the primary phase windings and a common source phase, and share a common dc source referenced to the common source phase. While a single-phase inverter with its isolated dc source can be used for the third delta connected primary phase winding, it is further preferred that this single-phase inverter share the common dc source used by the two-phase inverter. In that case, one injection transformer is needed to isolate the compensation voltage inserted by this single-phase inverter in series with the third delta connected primary winding. Similar DVR arrangements can be used to provide series voltage compensation on the load side of a transformer with a delta connected secondary winding.

19 Claims, 7 Drawing Sheets

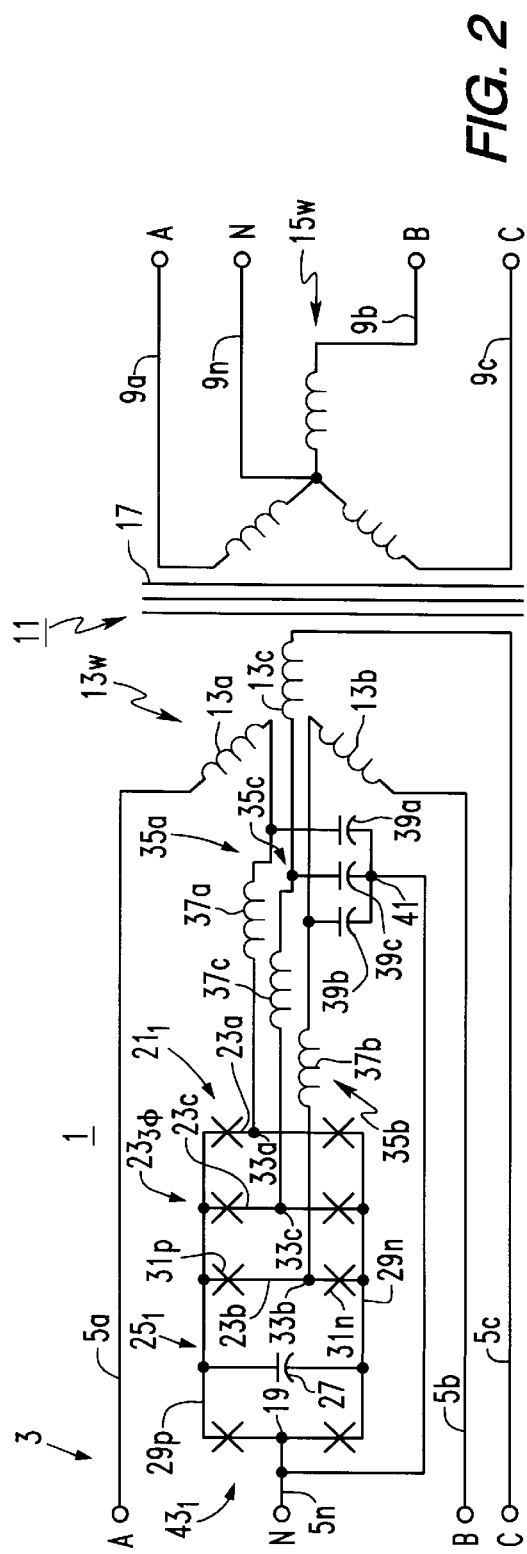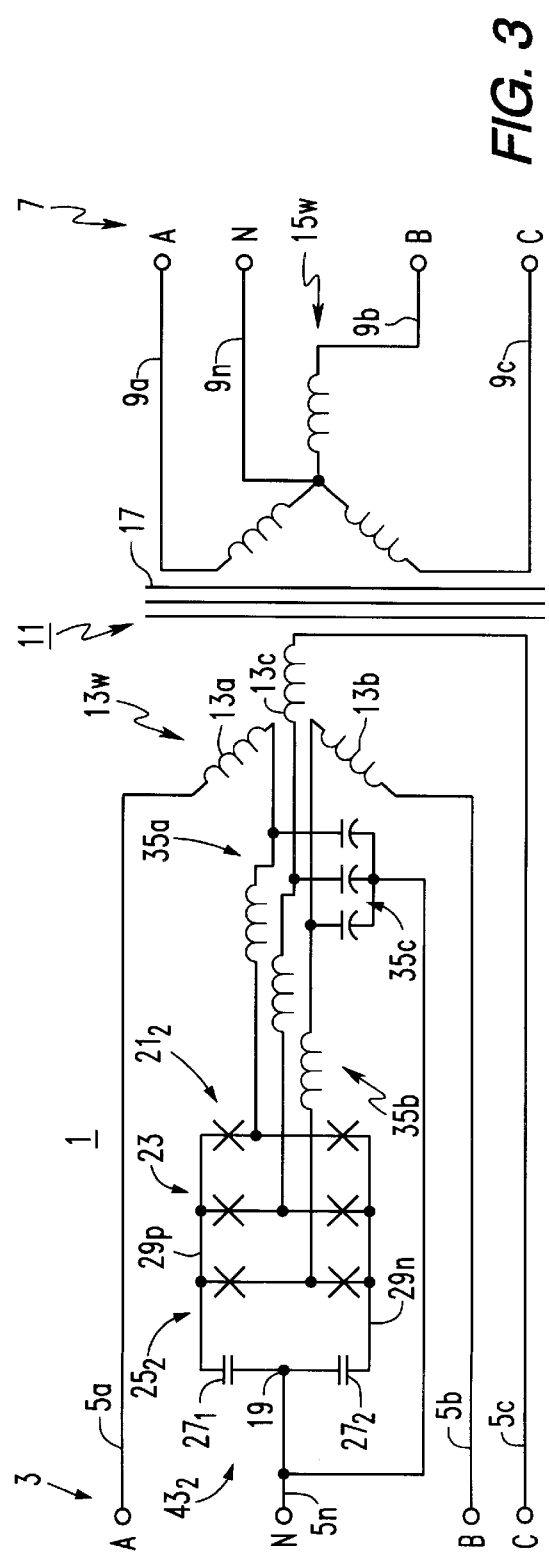

POWER INVERTER APPARATUS USING A TRANSFORMER WITH ITS PRIMARY WINDING CONNECTED THE SOURCE END AND A SECONDARY WINDING CONNECTED TO THE LOAD END OF AN AC POWER LINE TO INSERT SERIES COMPENSATION

BACKGROUND OF THE INVENTION

1. Field of the Invention

This invention relates to apparatus incorporating solid state inverters for providing compensation on electric power lines. More particularly, it relates to a dynamic voltage restorer which injects a compensating voltage in series with the power line to offset voltage sags, such as may be caused by an upstream fault. The compensating voltage is injected using the primary winding or a delta connected secondary winding of a load transformer, which in many cases, is already provided for voltage transformation.

2. Background Information

In existing dynamic voltage restorer (DVR) designs, a partially rated compensating voltage source is injected in series into a utility power line. This requires isolation transformers between the voltage source inverter that generates the compensating voltage and the feeder where it is injected. These injection transformers, which must be provided for each phase, have to be rated to handle two per unit or more flux excursions to enable a range of wave shapes to be synthesized. Thus, these transformers are large and costly.

To avoid the need for injection transformers and their associated problems, U.S. patent application Ser. No. 09/017,034, filed on Feb. 2, 1998, describes an arrangement for placing the inverter at the neutral of the secondary winding of a load transformer. Three or four wire wye type systems can be handled using this technique. One drawback of this arrangement is that the inverter is placed on the low-voltage side of the transformer. The DVR inverter must therefore handle high currents at relatively low voltage. The forward-conduction voltage drop of the inverter switches will be a significant portion of the total ac voltage, resulting in relatively high losses. No arrangement is described for injection into a delta-connected load transformer.

Thus, there is a need for an improved DVR which eliminates, or at least reduces, the requirement for injection transformers to insert the compensating voltages into the power line.

There is a particularly need for such a DVR with improved efficiency.

There is also a need for such a DVR which can be used with power lines with any number of phases.

There is especially a need for such a DVR which can be used with three-phase systems with either delta or wye connected transformer windings.

There is a further need for such an improved DVR which can use a load transformer to inject the compensating voltage into the power line, especially in systems where such a transformer is already available.

SUMMARY OF THE INVENTION

These needs and others are satisfied by the invention which is directed to a DVR which inserts inverter generated compensating voltages in series with the primary winding of a load transformer connected in the power line. For three-phase power lines, the three-phase primary winding can be either wye or delta connected. In the former case, three single-phase inverters, each with their own floating dc source, can be inserted directly in series with the three primary phase windings of the load transformer. Preferably however, the poles of a single three-phase inverter with a common dc source are directly connected in series with the three primary phase windings to form the wye connection. This common dc source can be referenced to the neutral conductor, if provided, either by an additional, reference inverter pole, or by direct connection of a midpoint between split capacitors in the dc source to the neutral conductor or other means.

For delta connected primary phase windings, separate single-phase inverters each with its own floating dc source can be directly connected in each of the delta connected primary phase windings. Preferably however, the poles of a two-phase inverter are direct connected in series between two of the primary phase windings and a common source phase, and share a common dc source or other means. Again, this dc source can be referenced to the common source phase either by a reference inverter pole or direct connection to the midpoint between split capacitors in the dc source or by other means. While a single-phase inverter with its isolated dc source can be used for the third delta connected primary phase winding, it is further preferred that this single-phase inverter share the common dc source used by the two-phase inverter. In that case, a single injection transformer is needed to isolate the compensation voltage inserted by this single-phase inverter in series with the third delta connected primary winding. Similar arrangements can be used to provide series voltage compensation on the load side of a transformer with a delta connected secondary winding.

BRIEF DESCRIPTION OF THE DRAWINGS

A full understanding of the invention can be gained from the following description of the preferred embodiments when read in conjunction with the accompanying drawings in which:

FIG. 2 is a detailed schematic circuit diagram of the DVR of FIG. 1.

FIG. 3 is a schematic circuit diagram of a modification to the DVR of FIG. 2.

DESCRIPTION OF THE PREFERRED EMBODIMENTS

Figure 1:
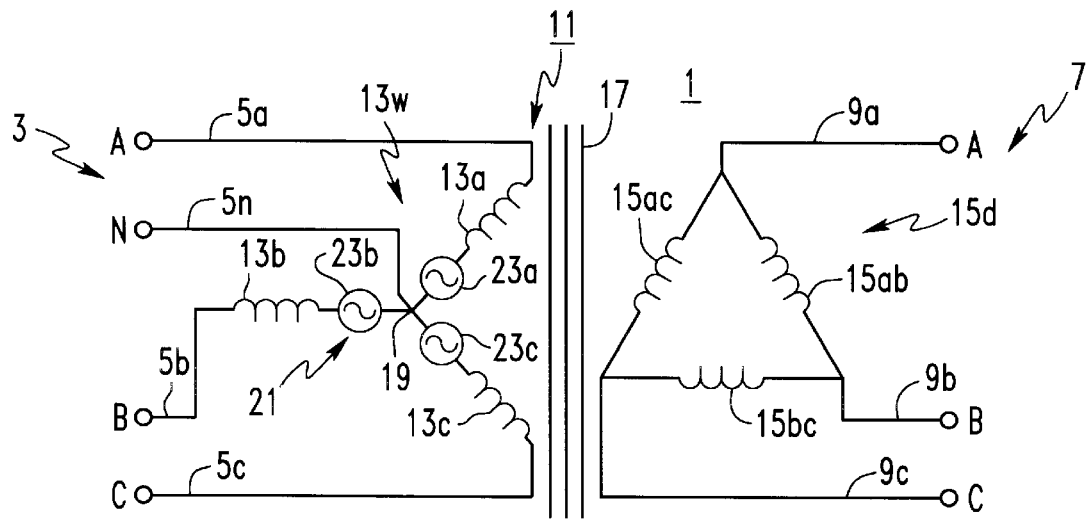
FIG. 1 is a high level schematic circuit diagram of a DVR in accordance with the invention applied to a three-phase ac power line having a wye connected primary winding with a neutral.

The concept of the invention is to insert series compensating voltages into an ac power line in series with the line voltages using a load transformer which, in many cases, is already available in the power line for stepping the line voltage up or down. A first embodiment of the invention is shown in FIG. 1 in which a three-phase ac power line 1 has a source end 3 with source end phase conductors 5a–5c, and a load end 7 with load end conductors 9a–9c. A load transformer 11 has a primary winding 13w connected to the source end conductors 5a–5c and a three-phase secondary winding 15d connected to the load end conductors 9a–9c. The primary and secondary windings 13w, 15d are wound on a core 17 although they need not be. The three primary phase windings 13a–13c are wye connected with the common node 19 connected to a source end neutral conductor 5n. In the arrangement shown in FIG. 1, the three secondary windings 15ac, 15bc, 15ab of the load transformer 11 are delta connected. However, the three-phase secondary winding 15d could also be wye connected.

The dynamic voltage restorer (DVR) 21 is an inverter system which includes three inverter phases 23a–23c each directly connected in series with a corresponding one of the primary phase windings 13a–13c of the load transformer and the common point of the wye 19. The inverter phases 23a–23c generate compensating voltages which are added to the voltages generated by the primary phase windings 13a–13c. No separate injection transformers are required. Thus, the compensating voltage from the DVR 21 is not limited by injection transformer saturation. The compensating voltage can be arbitrary, with no flux limit.

FIG. 2 is a more detailed schematic of an implementation of the DVR $21_1$ of FIG. 1. As the inverter phases are connected to the common node 19, the inverter phases 23a–23c can be the poles of a single three-phase inverter $23_{3\Phi}$ which includes a common dc source $25_1$ for the three poles. This common dc source $25_1$ can be an energy storage device in the form of a capacitor 27. In any event, the common dc source is connected between a positive dc rail 29p and a negative dc rail 29n. Each of the poles of the inverter 23 include a pair of switches 31p and 31n connected in series between the positive rail 29p and negative rail 29n. The ac terminals 33a–33c of the inverter 23 are directly connected in series with the primary phase windings 13a–13c. For power applications, the switches 31 can be, for instance, insulated gate bipolar transistors (IGBTs) or gate turn off devices (GTOs). In order to reduce harmonics, LC filters 35a–35c in the form of inductors 37a–37c connected in series and shunt capacitors 39a–39c are provided between the ac terminals 33a–33c and the corresponding primary phase windings 13a–13c. The capacitors 39a–39c are connected to a common point 41. Where the source end of the ac power line 1 has a neutral conductor 5n, the dc source $25_1$ is referenced to the neutral voltage by a reference circuit $43_1$ which in the DVR $21_1$ of FIG. 2 is a single pole reference inverter. As can be appreciated from FIG. 2, one advantage of this arrangement is that a single three-phase inverter 23 with a single energy supply $25_1$ can be used for all three phases. As indicated, the secondary winding 15w can be wye connected, including connection to a secondary neutral conductor 9n, if provided. Alternatively, the secondary winding could be delta connected.

A modification of the DVR of FIG. 2 is shown in FIG. 3. The DVR $21_2$ is identical to $21_1$ in FIG. 2 except that the dc source $25_2$ and the reference circuit $43_2$ are modified. In this arrangement, the energy storage capacitor of the common dc source $25_2$ is split into two equal value capacitors $27_1$ and $27_2$. The reference circuit $43_2$ then comprises the connection 19 of the neutral conductor 5n to the midpoint between the two capacitors $27_1$ and $27_2$. It should also be noted that, if the source end 3 of the ac line 1 does not have a neutral conductor $5_n$, then the voltage of the dc voltage source $25_2$ just floats. FIG. 3 also illustrates an application in which the secondary winding $15_w$ of the load transformer 11 is wye connected to a neutral conductor 9n on the load end 7 of the power line to provide a fall four wire system.

The invention can also be applied to an installation in which the load transformer 11 has a delta wound primary winding 13d. In one such embodiment of the DVR $21_3$ shown in FIG. 4, the inverter system is actually three single-phase inverters 23ac, 23bc, 23ab, each directly connected in series with an associated one of the phase winding 13ac, 13bc and 13ab, and the phase conductors 5a–5c, respectively, of the source end 3 of the ac power line 1. In this case, the dc sources 25ac, 25bc and 25ab each separately float. Again, while the secondary winding 15w in FIG. 4 is shown as wye connected, delta connected secondaries could also be used in this embodiment.

Figure 5:
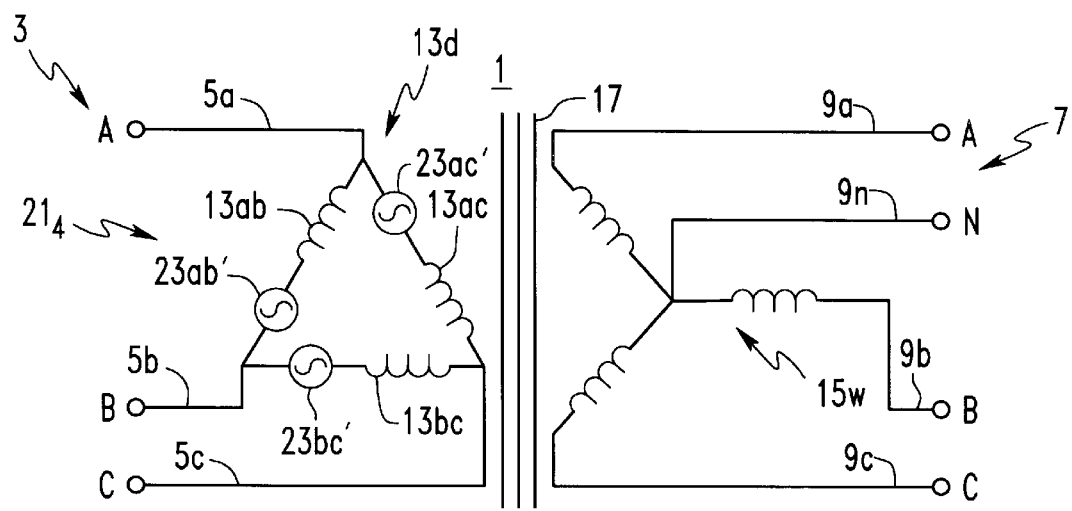
FIG. 5 is a high level schematic circuit diagram of a modified form of a DVR applied to a three-phase ac power line with a delta connected primary winding.
Figure 4:
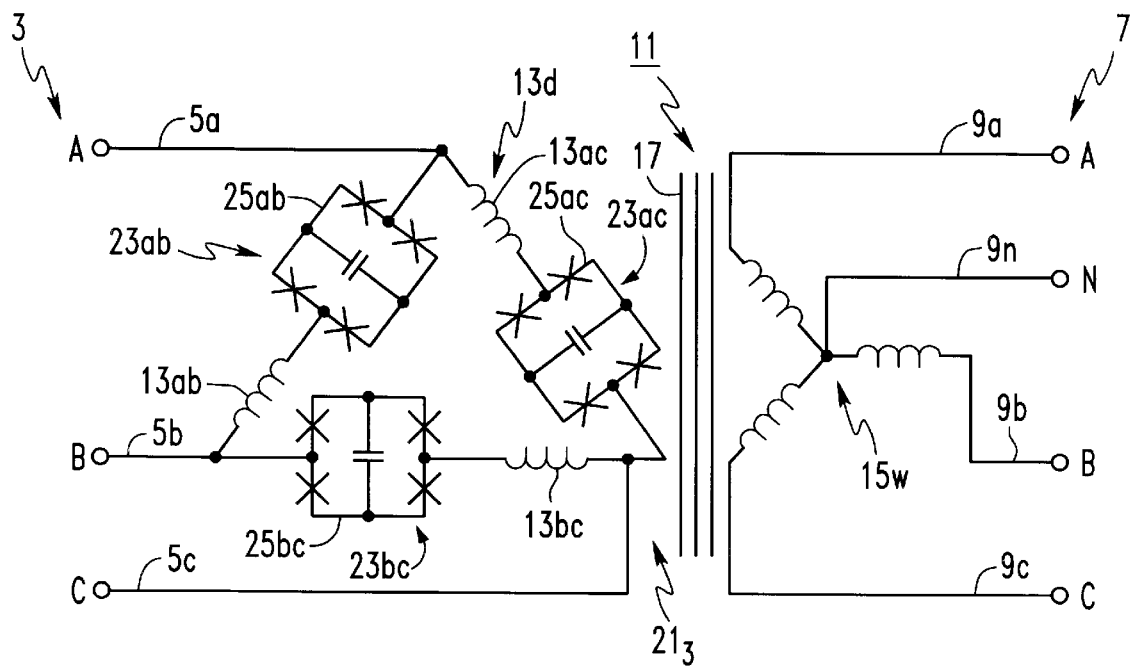
FIG. 4 is a schematic diagram of a DVR in accordance with the invention applied to a three-phase ac power line with a delta connected primary winding.

Each of the single pole inverters 23ac, 23bc, 23ab in the DVR $21_3$ of FIG. 4 require two separate poles. Other arrangements for a DVR connected to a delta connected primary winding are possible which reduce the inverter requirements. FIG. 5 is a high level schematic circuit diagram illustrating a modified arrangement for a DVR $21_4$ applied to a three-phase ac power line with a delta connected primary winding. In this arrangement, two inverter phases such as 23ab' and 23bc' are connected in series with a corresponding one of the delta phase windings 13ab and 13bc and to a common source end conductor 5b. The third inverter 23ac' is connected in series with the third primary phase winding 13ac and another source end conductor 5a.

Figure 6:
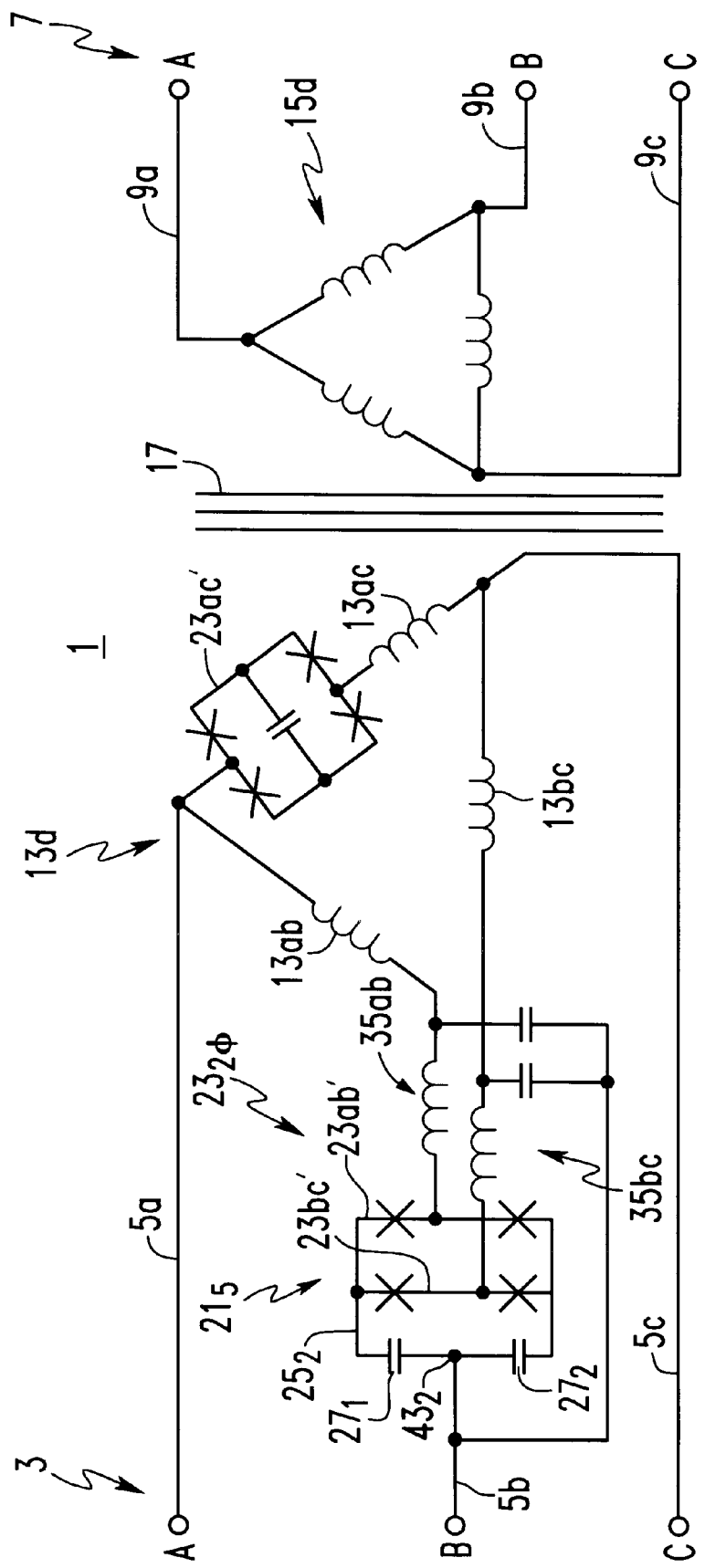
FIG. 6 is a detailed schematic circuit diagram of one implementation of the DVR of FIG. 5.

One implementation of the arrangement shown in FIG. 5 is illustrated in FIG. 6. In this DVR $21_5$ the inverter 23ac' is a single-phase inverter with a floating dc source 25ac' directly connected in series with the delta phase winding 13ac. As the other two inverter phases 23ab' and 23bc' are connected to a common conductor 5b of the source end of the ac power line 1, they can share a common dc source $25_2$ and in fact can be the two poles of a two-phase inverter $23_{2\Phi}$. As can be seen, this eliminates two poles that were required in the embodiment of FIG. 4 for the additional single-phase inverters. It will also be noted that the dc voltage of the source $25_2$ is referenced to the voltage on the common source end phase conductor 5b. While a split capacitor arrangement $27_1$, $27_2$ is used in the embodiment of FIG. 6 to reference the common dc source to phase B, a reference inverter $43_1$ such as shown in FIG. 2 could be used.

Figure 7:
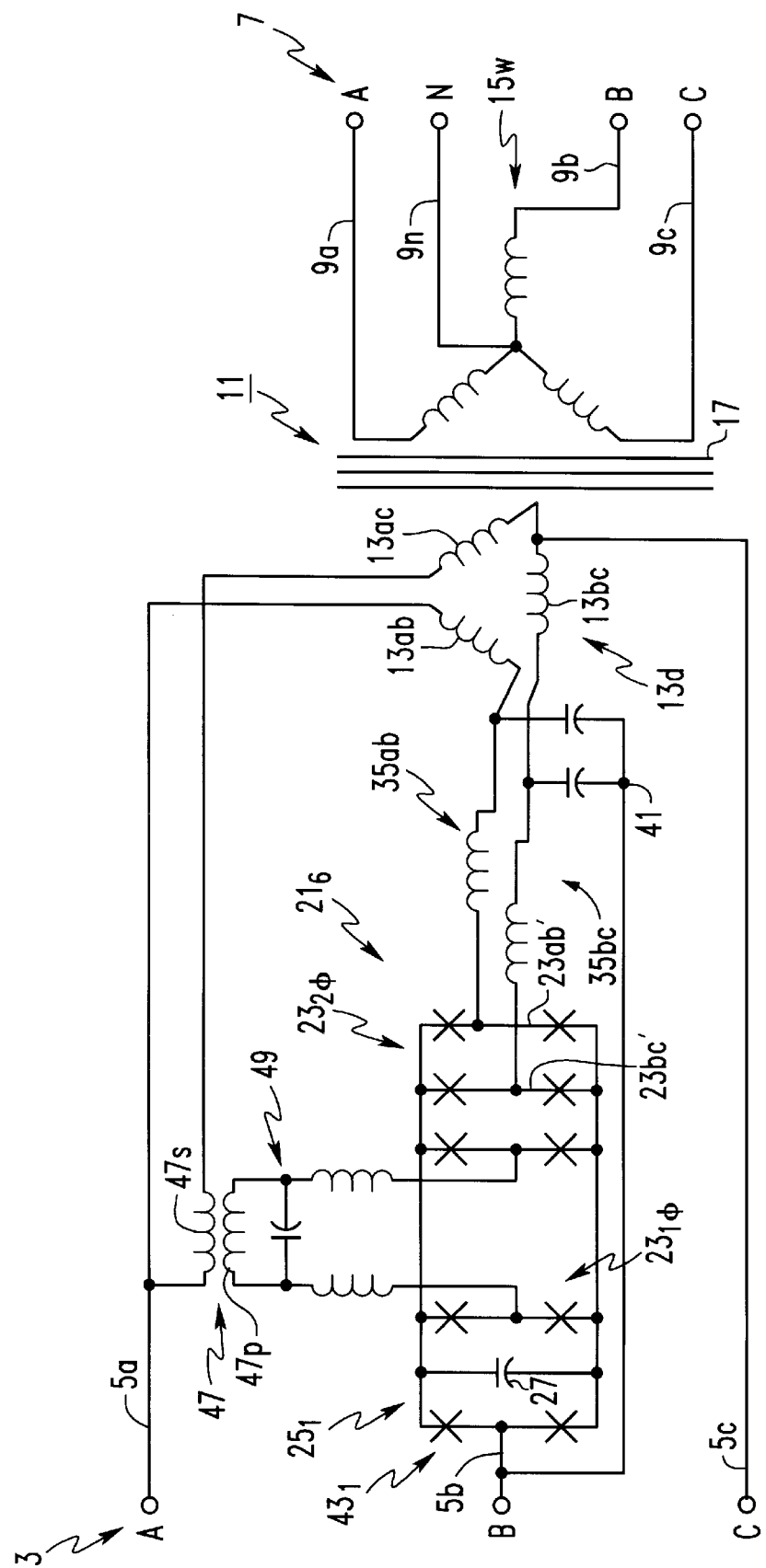
FIG. 7 is a detailed schematic circuit diagram of another implementation of the DVR of FIG. 5.

An alternate implementation of the arrangement shown in FIG. 5 is illustrated in FIG. 7. In this DVR $21_6$, a common dc source $25_1$ is used for all three inverter phases. Again, the two poles 23ab' and 23bc' of a two-phase inverter $23_{2\Phi}$ are used to generate the compensating voltages directly connected in series with two of the delta primary windings 13ab and 13bc. A single-phase inverter $23_{1\Phi}$ with its two poles provides the compensating voltage added to the voltage generated by the winding 13ac. Because a common dc source is used, isolation must be provided for this latter compensating voltage. Hence, an injection transformer 47 has its primary winding 47P connected to the single-phase inverter $23_{1\Phi}$ and its secondary winding 47s connected in series between the winding 13ac and the A phase conductor 5a of the source end 3 of the power line 1. An additional filter 49 is included between the inverter $23_{1\Phi}$ and the primary winding 47P of the injection transformer, as is common. Again, while a reference inverter $43_1$ is used to reference the dc voltage of the source 25 to the voltage on the B phase conductor 5b, the arrangement of FIG. 6 could alternatively be used.

Figure 8:
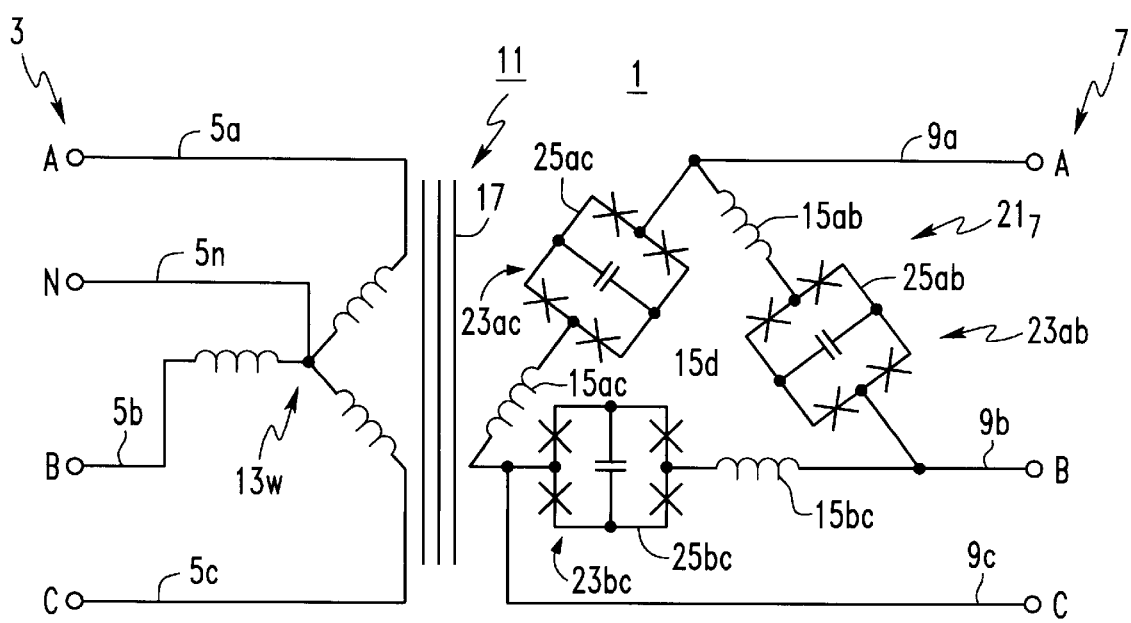
FIG. 8 is a high level schematic circuit diagram illustrating a DVR which injects compensating voltages into the secondary winding of a load transformer.

As mentioned, application Ser. No. 09/017,034 filed on Feb. 2, 1998, teaches an arrangement for directly injecting compensating voltages into the secondary winding of a load transformer by providing a wye connection for the secondary phase windings. It did not provide an arrangement for a delta wound secondary. The principles of the present invention can be adapted to achieve this end. FIG. 8 illustrates such a DVR $21_7$ in which single-phase inverters 23ab, 23bc, 23ac with isolated floating dc sources 25ab, 25bc, 25ac such as those employed in FIG. 4 are directly connected in series with each of the secondary phase windings 15ab, 15bc, and 15ac of the delta wound secondary winding 15d of the load transformer 11.

Figure 9:
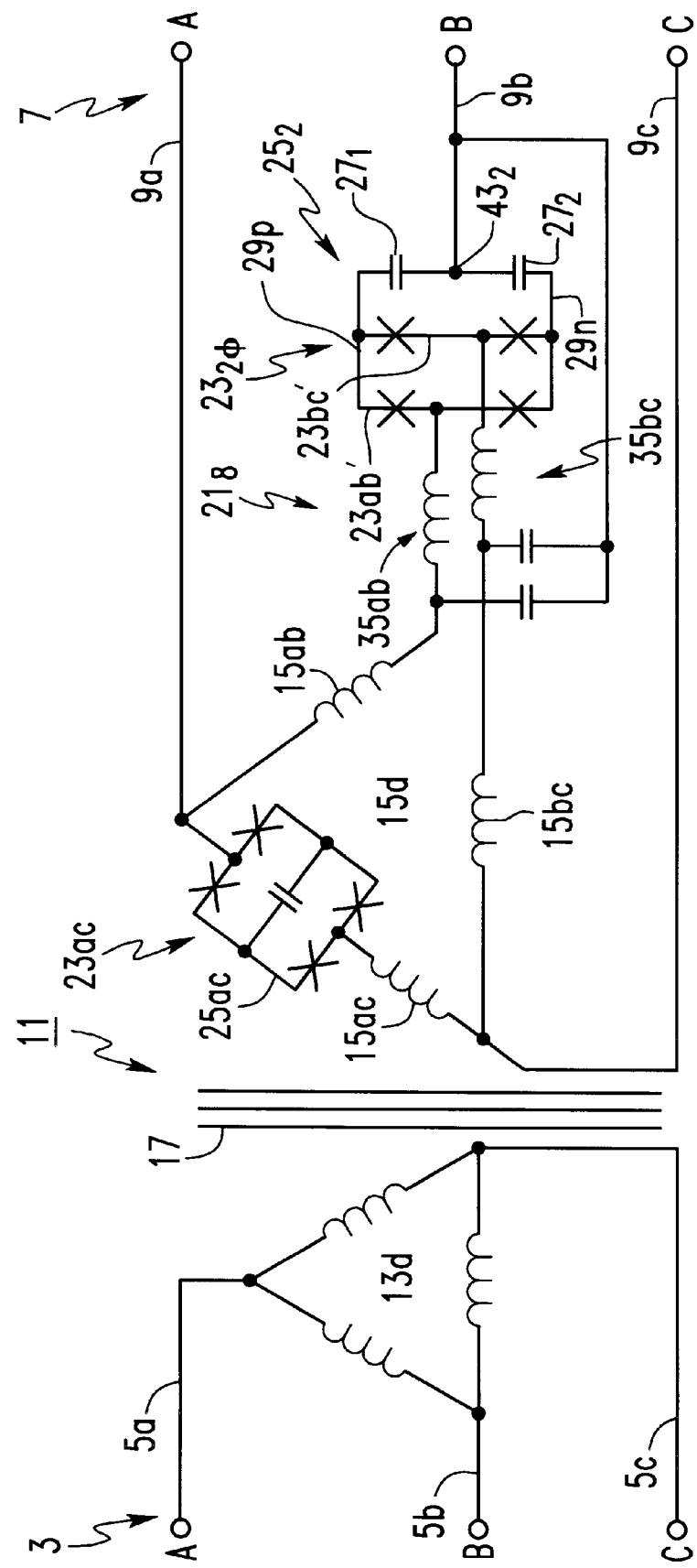
FIG. 9 is a detailed schematic circuit diagram of a second embodiment of a DVR which injects compensating voltages into a delta wound secondary winding of a load transformer in a three-phase ac power line.
Figure 10:
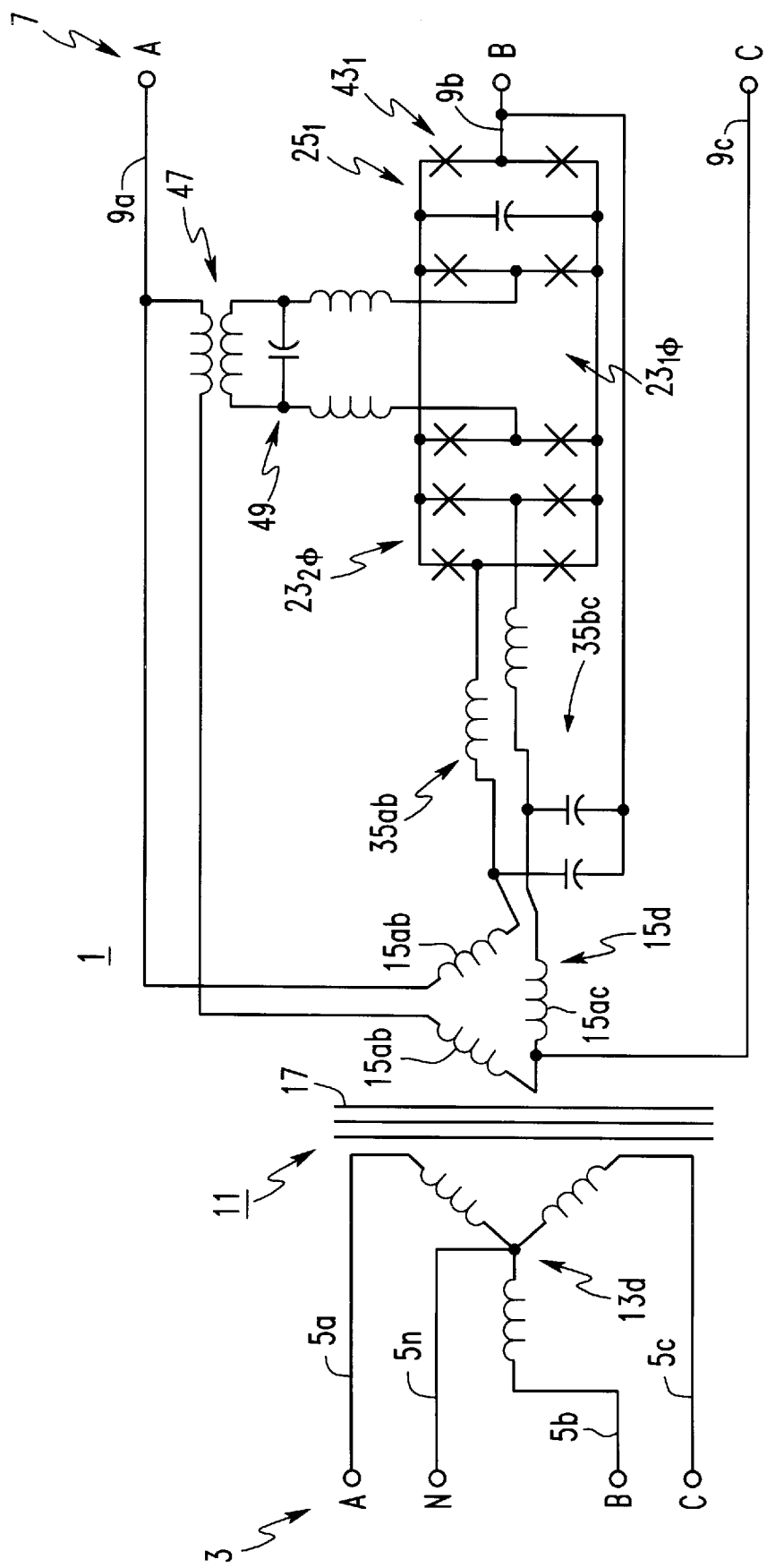
FIG. 10 is a schematic circuit diagram of a modification to the DVR of FIG. 9.

FIG. 9 illustrates a second embodiment of a DVR $21_8$ which injects compensating voltages into a delta wound secondary winding 15d of a load transformer 11 in a three-phase ac power line 1. This arrangement is similar to that in FIG. 6 in that a separate single-phase inverter 23ac is connected in series with the winding 15ac while a two-phase inverter $23_{2\Phi}$ with a common dc source $25_2$ having positive and negative rails 29p, 29n referenced to the voltage on a common source end conductor 9b injects the compensating voltages in series with the other two delta secondary-phase windings 15ab and 15bc. Alternatively, the common dc source $25_1$ can be used for the single-phase inverter $23_{1\Phi}$ also as long as an injection transformer 47, with its accompanying filter 49, is used to insert the compensating voltage in series with the third delta secondary-phase winding 15ac, as shown in the DVR $21_9$ of FIG. 10. Of course, either of the arrangements for referencing the dc voltage on the common dc source in the circuits of FIGS. 9 and 10 can be used in the other.

While specific embodiments of the invention have been described in detail, it will be appreciated by those skilled in the art that various modifications and alternatives to those details could be developed in light of the overall teachings of the disclosure. For instance, embodiments have been described for applying the invention to three-phase ac power lines. It will be realized by those skilled in the art that the invention can also be applied to ac power lines with other numbers of phases, including single-phase. Other variations are also embraced by the invention. Accordingly, the particular arrangements disclosed are meant to be illustrative only and not limiting as to the scope of invention which is to be given the full breath of the claims appended and any and all equivalents thereof.

What is claimed is:

1. Apparatus for providing compensation in an ac power line between a source end and a load end, said apparatus comprising:
    transformer means having primary winding means connected to said source end of said ac power line, and secondary winding means connected to said load end of said ac power line; and
    inverter means connected to said primary winding means for providing series voltage compensation to said ac power line.

2. The apparatus of claim 1 wherein said ac power line is a three-phase ac power line, said primary winding means comprises three primary phase windings, and said inverter means comprises three-phase inverter means connected to said three primary phase windings.

3. The apparatus of claim 2 wherein said three primary phase windings are wye connected by said three-phase inverter means.

4. The apparatus of claim 3 wherein said three-phase inverter means comprises three inverter phases each one connected in series with one of said three primary phase windings, and all connected to a common neutral node.

5. The apparatus of claim 4 wherein said three inverter phases comprise a single three-phase inverter and said inverter means includes a common dc source for said three-phase inverter.

6. The apparatus of claim 2 wherein said three primary phase windings are delta connected.

7. The apparatus of claim 6 wherein said three-phase inverter means comprises three single-phase inverters each having an isolated dc voltage source and each connected in series with a different one of said three primary phase windings and a phase of said source end of said three-phase ac power line.

8. The apparatus of claim 6 wherein said three-phase inverter means includes a two-phase inverter having first and second inverter poles connected in series with first and second of said primary phase windings and a common phase of said source end of said ac power line, and a single-phase inverter connected in series with a third of said primary phase windings and another phase of said source end of said ac power line.

9. The apparatus of claim 8 wherein said inverter means further includes a common dc source for said first and second inverter poles and referencing means referencing dc voltage of said common dc source to said common phase of said source end of said ac power line.

10. The apparatus of claim 9 wherein said common dc source comprises positive and negative dc rails and capacitor means connected between said rails, and wherein said referencing means comprises an additional inverter pole connected between said positive and negative rails and said common phase of said source end of said ac power line.

11. The apparatus of claim 9 wherein said common dc source comprises positive and negative dc rails and a pair of capacitors connected in series between said positive and negative rails, and wherein said referencing means is a common point between said pair of capacitors connected to said common phase of said source end of said ac power line.

12. The apparatus of claim 9 wherein said single-phase inverter is also connected to said common dc source and wherein said inverter means additionally includes an injection transformer connecting said single-phase inverter in series with said third primary phase winding and said another phase of said source end of said ac power line.

13. Apparatus for providing compensation in a three-phase ac power line having a source end and a load end, said apparatus comprising:
    three-phase transformer means having three primary phase windings connected to said source end of said three-phase ac power line, and three secondary phase windings delta connected to said load end of said three-phase ac power line; and
    inverter means connected to provide a compensating voltage in series with each of said three delta connected secondary phase windings of said three-phase transformer.

14. The apparatus of claim 13 wherein said inverter means comprises three single-phase inverters each having an isolated dc voltage source and each connected in series with a different one of said three secondary phase windings and a phase of said load end of said three-phase ac power line.

15. The apparatus of claim 13 wherein said inverter means includes a two-phase inverter having first and second inverter poles connected in series with first and second of said secondary phase windings and a common phase of said source end of said ac power line, and a single-phase inverter connected in series with a third of said primary phase windings and another phase of said load end of said ac power line.

16. The apparatus of claim 15 wherein said inverter means further includes a common dc source for said first and second inverter poles and referencing means referencing dc voltage of said common dc source to said common phase of said load end of said ac power line.

17. The apparatus of claim 16 wherein said common dc source comprises positive and negative dc rails and capacitor means connected between said rails, and wherein said referencing means comprises an additional inverter pole connected between said positive and negative rails and said common phase of said load end of said ac power line.

18. The apparatus of claim 16 wherein said common dc source comprises positive and negative dc rails and a pair of capacitors connected in series between said positive and negative rails, and wherein said referencing means comprises a common point between said pair of capacitors connected to said common phase of said load end of said ac power line.

19. The apparatus of claim 16 wherein said single-phase inverter is also connected to said common dc source and wherein said inverter means additionally includes an injection transformer connecting said single-phase inverter in series with said third secondary phase winding and to said another phase of said load end of said ac power line.

* * * * *